(12) United States Patent
Morimoto

(10) Patent No.: US 10,677,085 B2
(45) Date of Patent: Jun. 9, 2020

(54) STOP VALVE AND STEAM TURBINE

(71) Applicant: MITSUBISHI HEAVY INDUSTRIES COMPRESSOR CORPORATION, Tokyo (JP)

(72) Inventor: Makio Morimoto, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 182 days.

(21) Appl. No.: 16/064,857

(22) PCT Filed: Feb. 26, 2016

(86) PCT No.: PCT/JP2016/055852
§ 371 (c)(1),
(2) Date: Jun. 21, 2018

(87) PCT Pub. No.: WO2017/145365
PCT Pub. Date: Aug. 31, 2017

(65) Prior Publication Data
US 2019/0003330 A1  Jan. 3, 2019

(51) Int. Cl.
*F16K 1/32* (2006.01)
*F01D 17/00* (2006.01)
(Continued)

(52) U.S. Cl.
CPC .............. *F01D 17/00* (2013.01); *F16K 1/04* (2013.01); *F16K 1/32* (2013.01); *F16K 1/385* (2013.01);
(Continued)

(58) Field of Classification Search
CPC ........ F01D 17/00; F16K 31/1221; F16K 1/32; F16K 1/427; F16K 1/385; F16K 1/04; F16K 35/06; F16K 31/1223; F05D 2210/12
(Continued)

(56) References Cited

U.S. PATENT DOCUMENTS 3,935,877 A * 2/1976 Franceschi ............... E03B 9/06
                                              137/296
4,159,132 A * 6/1979 Hitz ........................ F16L 23/02
                                              285/336
(Continued)

FOREIGN PATENT DOCUMENTS

| JP | H06-088503 A | 3/1994 |
| JP | 2005-505726 A | 2/2005 |
| JP | 2010-121523 A | 6/2010 |

OTHER PUBLICATIONS

International Search Report for corresponding International Application No. PCT/JP2016/055852, dated May 24, 2016 (4 pages).
(Continued)

*Primary Examiner* — John Bastianelli
(74) *Attorney, Agent, or Firm* — Osha Liang LLP

(57) ABSTRACT

A stop valve includes: a valve seat in a fluid flow path; a valve disc that contacts the valve seat and that closes the fluid flow path; a valve stem that extends along a center axis includes a first end, in a direction of the center axis, that is connected to the valve disc; a spindle that extends along the center axis and comprises an end surface of a first end, in the direction of the center axis, that faces an end surface of a second end of the valve stem, in the direction of the center axis; and a connector that connects the second end of the valve stem to the first end of the spindle.

2 Claims, 6 Drawing Sheets

(51) Int. Cl.
   *F16K 31/122* (2006.01)
   *F16K 35/06* (2006.01)
   *F16K 1/04* (2006.01)
   *F16K 1/38* (2006.01)
   *F16K 1/42* (2006.01)

(52) U.S. Cl.
   CPC .......... *F16K 1/427* (2013.01); *F16K 31/1221* (2013.01); *F16K 35/06* (2013.01); *F05D 2210/12* (2013.01)

(58) Field of Classification Search
   USPC ........................................................ 251/291
   See application file for complete search history.

(56) References Cited

U.S. PATENT DOCUMENTS

| | | | | |
|---|---|---|---|---|
| 5,131,632 A * | 7/1992 | Olson | ..................... | F16L 37/02 285/322 |
| 6,886,805 B2 * | 5/2005 | McCarty | ............... | F16B 7/0426 251/214 |
| 7,172,172 B2 * | 2/2007 | Gethmann | .......... | B25B 27/0028 251/214 |
| 2003/0068241 A1 | 4/2003 | McCollough et al. | | |

OTHER PUBLICATIONS

Written Opinion for corresponding International Application No. PCT/JP2016/055852, dated May 24, 2016 (9 pages).

* cited by examiner

STOP VALVE AND STEAM TURBINE

TECHNICAL FIELD

The present invention relates to a stop valve and a steam turbine.

BACKGROUND

A steam turbine rotationally drives a rotor by steam supplied from a boiler. The steam turbine transmits a rotation of the rotor to a generator so as to operate the generator.

A stop valve is provided in a steam supply pipe through which the steam is fed from the boiler to the turbine main body. During a normal operation of the steam turbine, the stop valve is in an open state. Accordingly, the steam is supplied from the boiler to the turbine main body through the steam supply pipe. For example, in a case where any abnormality occurs in the steam turbine, the stop valve closes the steam supply pipe and blocks the supply of the steam from the boiler to the turbine main body.

Patent Document 1 discloses a stop valve which includes a valve main body which has a valve seat, a valve disc which can abut the valve seat, a valve stem in which one end is connected to valve disc, a drive shaft which is connected to the other end of the valve stem, and a drive device which moves the drive shaft forward or backward in a direction in which the valve disc moves close to or away from the valve seat.

In the stop valve disclosed in Patent Document 1, the valve stem and the drive shaft are connected to each other via a connection member. The connection member includes division members facing each other in a state where the valve stem and the drive shaft are interposed therebetween. Each division member includes engagement protruding portions which engage with a valve stem-side engagement recessed portion formed in the valve stem and a drive shaft-side engagement recessed portion formed in the drive shaft. An end portion of the valve stem and an end portion of the drive shaft are interposed between a pair of the division members, and thus, the engagement protruding portions formed in each division member engage with the valve stem-side engagement recessed portion and the drive shaft-side engagement recessed portion. In this state, the pair of division members is integrally connected by a bolt which extends in a direction orthogonal to a direction of a center axis of each of the valve stem and the drive shaft.

CITATION LIST

[Patent Document 1] Japanese Unexamined Patent Application, First Publication No. 2010-121523

However, in the above-described configuration, when the valve stem and the drive shaft, which is a spindle, are connected to each other or when the valve stem and the spindle are separated from each other, it is necessary to tighten or loosen the bolt, which takes labor and time.

In addition, during an operation of a steam turbine, vibrations are transmitted to a connection portion between the valve stem and the spindle due to pulsation or the like of steam passing through the stop valve. There is a concern that the bolt may be loosened due to the vibrations.

SUMMARY

One or more embodiments of the present invention relate to a stop valve and a steam turbine capable of easily and reliably connecting the valve stem and the spindle to each other.

According to a first aspect of one or more embodiments of the present invention, there is provided a stop valve, including: a valve seat portion (or valve seat) which is provided in a flow path through which a fluid flows; a valve disc configured to come into contact with the valve seat portion and close the flow path; a valve stem which extends along a center axis and in which a first end portion in a direction of the center axis is connected to the valve disc; a spindle which extends along the center axis and is provide such that an end surface of a first end portion in the direction of the center axis faces an end surface of a second end portion of the valve stem in the direction of the center axis; and a connection member (or a connector) which connects the second end portion of the valve stem to the first end portion of the spindle, in which the valve stem includes a valve rod-side engaged recessed portion (or valve rod-side engaged recession) which is recessed in a radial direction about the center axis, the spindle includes a core rod-side engaged recessed portion (or core rod-side engaged recession) which is recessed in the radial direction, and the connection member includes a coupler which includes a valve rod-side engagement protruding portion that engages with the valve rod-side engaged recessed portion and a core rod-side engagement protruding portion that engages with the core rod-side engaged recessed portion on an inner peripheral surface of the coupling member, and which is divided into a plurality of coupling members (or couplings) in a circumferential direction about the center axis, and a cover which is formed in a tubular shape, accommodates the plurality of coupling members therein, and restricts movements of the coupling members toward the outside in the radial direction.

According to this configuration, it is possible to connect the valve stem and the spindle to each other only by disposing the cover after disposing the plurality of coupling members on the outer peripheral sides of the second end portion of the valve stem and the first end portion of the spindle. Movements of the plurality of coupling members toward the outside in the radial direction are restricted by the cover, and thus, an engagement state between the valve rod-side engagement protruding portion and the valve rod-side engaged recessed portion and an engagement state between the core rod-side engagement protruding portion and the core rod-side engaged recessed portion can be maintained. Accordingly, it is possible to reliably connect the valve stem and the spindle to each other.

In the stop valve according to a second aspect of one or more embodiments of the present invention, in accordance with the first aspect, the cover may include a contact portion (or contact surface) which abuts the coupling members in the direction of the center axis.

According to one or more embodiments, it is possible to prevent the cover from being displaced in the direction of the center axis by the contact portion. Accordingly, it is difficult for the cover to fall off.

In the stop valve according to a third aspect of one or more embodiments of the present invention, and in accordance with the second aspect, the connection member may further include a restraint member (or restraint) which restricts a movement of the cover in the direction of the center axis in a state where the contact portion abuts the coupling member.

According to this configuration, it is possible to prevent the cover from being displaced in the direction of the center axis from a state where the contact portion abuts the coupling member. That is, the movement of the cover in the direction of the center axis is restricted not only by the contact portion but also by the restraint member. Accordingly, it is difficult for the cover to fall off further.

In the stop valve according to a fourth aspect of one or more embodiments of the present invention, and in accordance with the third aspect, the coupling members may further include a protrusion portion (or third protrusion) which protrudes in the direction of the center axis from the cover, the protrusion portion may include a protruding groove portion (or ring groove) which is annularly formed around the center axis and is recessed in the radial direction, and the restraint member may be a snap ring which engages with the protruding groove portion from the outside in the radial direction.

According to this configuration, the snap ring which is the restraint member can be attached at a position at which the snap ring can be viewed from the outside after the cover is attached to the coupling member. Therefore, it is possible to easily attach the restraint member, and it is possible to easily mount the connection member.

According to a fifth aspect of one or more embodiments of the present invention, there is provided a steam turbine including: the stop valve according to any one of the first to fourth aspects; and a turbine main body which is driven by steam supplied from the flow path which is opened and closed by the stop valve.

According to one or more embodiments, it is possible to stably supply the steam to the turbine main body by the stop valve in which the valve stem and the spindle are reliably connected to each other.

According to one or more embodiments of present invention, it is possible to easily and reliably connect the valve stem and the spindle to each other.

DETAILED DESCRIPTION

Hereinafter, embodiments of a stop valve and a steam turbine according to the present invention will be described with reference to the drawings. However, the present invention is not limited to only the embodiments described herein.

Figure 1:
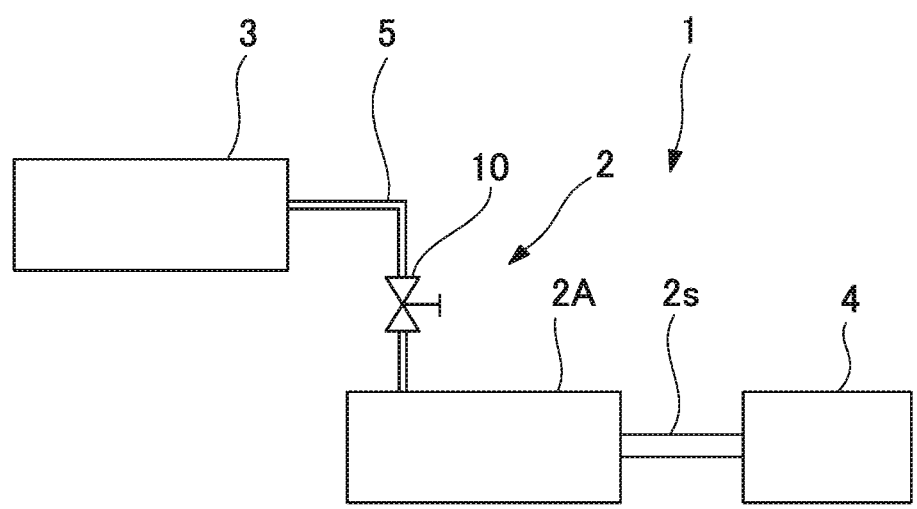
FIG. 1 is a schematic view showing the entire configuration of a steam turbine system configured using a stop valve according to one or more embodiments of the present invention.

FIG. 1 a schematic view showing the entire configuration of a steam turbine system configured using the stop valve according to one or more embodiments of the present invention.

As shown in FIG. 1, and in accordance with one or more embodiments, a steam turbine system 1 includes a steam turbine 2 which is driven by steam, a boiler 3 which supplies the steam to the steam turbine 2, and a generator 4 which is driven by the steam turbine 2.

The steam turbine 2 includes a turbine main body 2A, a steam supply pipe 5 through which the steam which is a fluid flows, and a stop valve 10. In the turbine main body 2A, a rotor (not shown) which is rotatably integrated with an output shaft $2s$ in a casing (not shown) is rotationally driven by the steam supplied from the boiler 3. For example, a rotation of the rotor (not shown) is transmitted to the generator 4 via the output shaft $2s$, and thus, electricity is generated in the generator 4.

The steam supply pipe 5 supplies the steam from the boiler 3 to the turbine main body 2A.

Figure 2:
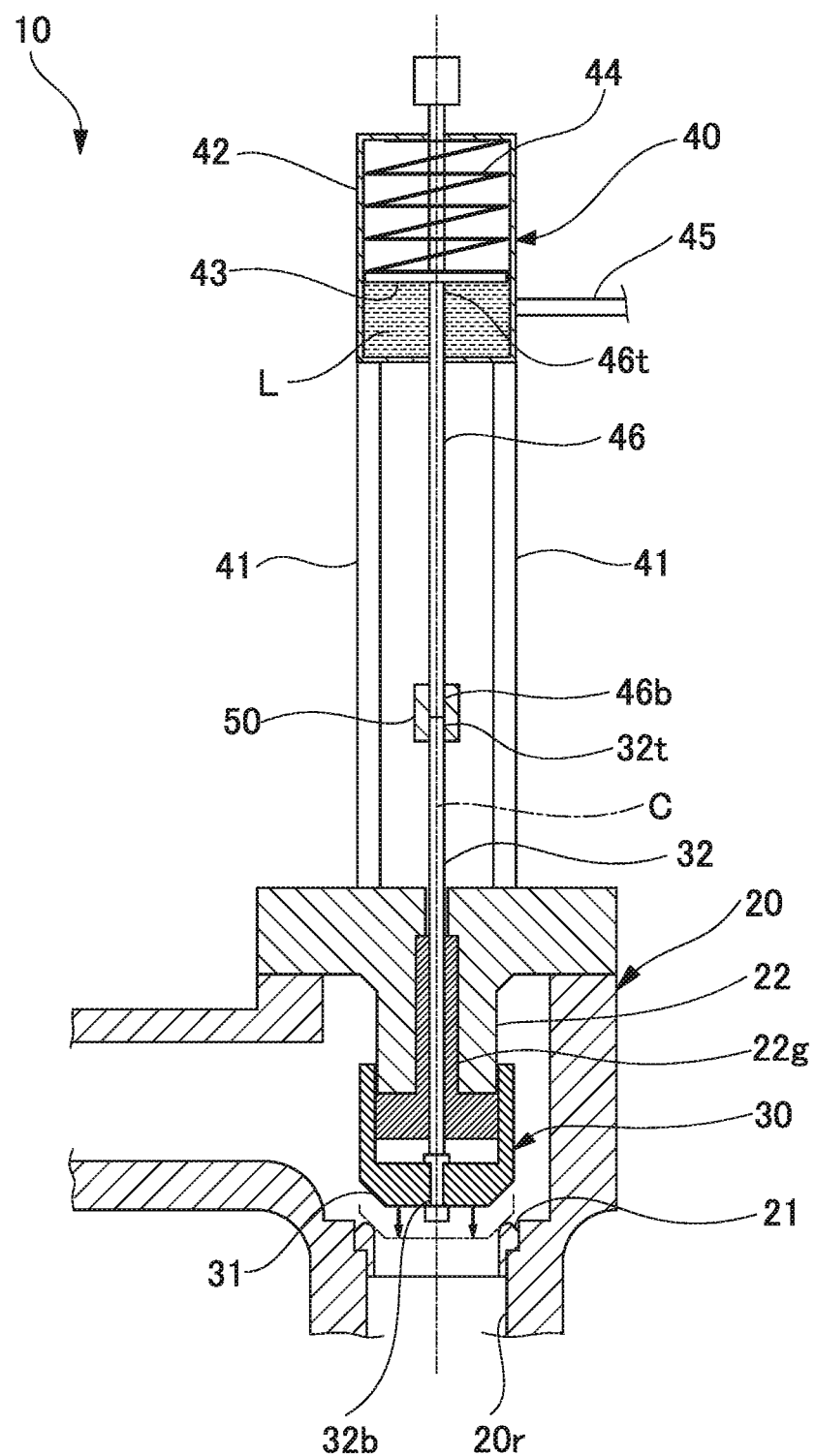
FIG. 2 is a sectional view showing a schematic configuration of the stop valve according to one or more embodiments.

The stop valve 10 adjusts the amount of the steam supplied to the turbine main body 2A. The stop valve 10 opens and closes the steam supply pipe 5 through which the steam flows. As shown in FIG. 2, and in accordance with one or more embodiments, the stop valve 10 includes a valve main body 20, a valve disc 30, a valve stem 32, a valve drive portion 40, a spindle 46, and a connection member 50.

The valve main body 20 opens and closes a flow path $20r$ through which the steam flows in order to adjust a flow rate of the steam in the turbine main body 2A. In the valve main body 20, the flow path $20r$ which communicates with the steam supply pipe 5 is formed inside the valve main body 20. The valve main body 20 includes a valve seat portion 21 and a valve disc support portion 22.

The valve seat portion 21 is provided in the flow path $20r$ through which the steam flows.

The valve disc support portion 22 supports the valve disc 30 inside the valve main body 20.

The valve disc 30 comes into contact with the valve seat portion 21 to close the flow path $20r$. The valve disc 30 is supported by the valve disc support portion 22 formed in the valve main body 20 so as to be movable toward the valve seat portion 21. A taper portion 31 in which an outer diameter is gradually decreased toward the valve seat portion 21 side is formed on a tip portion of the valve disc 30 facing the valve seat portion 21.

The valve stem 32 extends along a center axis. In the valve stem 32, a first end portion in a direction of the center axis C is connected to the valve disc 30. In one or more embodiments, the first end portion in the valve stem 32 in the direction of the center axis C is a lower end $32b$. That is, the valve disc 30 is connected to the lower end $32b$ of the valve stem 32. The valve stem 32 extends from the valve disc 30 in a direction away from the valve seat portion 21. In the valve stem 32, a second end portion in the direction of the center axis C protrudes from the valve main body 20 toward the valve drive portion 40. In one or more embodiments, the second end portion of the valve stem 32 in the direction of the center axis C is an upper end $32t$. The valve stem 32 is supported to be slidable in the direction of the center axis C by a guide bush $22g$ provided in the valve disc support portion 22.

In addition, in one or more embodiments, in a case where a side is simply referred to as a first end portion side in the direction of the center axis C, the side indicates one side (a lower side on a paper surface of FIG. 2) in the direction of the center axis C which is a side on which the valve main body 20 is disposed with respect to the connection member 50. Similarly, in a case where a side is simply referred to as a second end portion side in the direction of the center axis C, the side indicates the other side (an upper side on the paper surface of FIG. 2) in the direction of the center axis C which is a side on which the valve drive portion 40 is disposed with respect to the connection member 50.

The valve drive portion 40 moves the valve disc 30 by hydraulic pressure. The valve drive portion 40 includes a cylinder 42, a piston 43, a biasing member 44, and a fluid supply portion 45.

The cylinder 42 is formed in a tubular shape. An axis of the cylinder 42 is coaxially disposed with the center axis C of the valve stem 32. The cylinder 42 is supported by the valve main body 20 via a support member 41.

The piston 43 is provided so as to be movable in the direction of the center axis C in the cylinder 42. The spindle 46 is connected to a surface of the piston 43 facing the first end portion side in the direction of the center axis C.

The biasing member 44 is disposed on the second end portion side in the direction of the center axis C with respect to the piston 43 in the cylinder 42. For example, the biasing member 44 is configured of a coil spring or the like and is provided between the cylinder 42 and the piston 43 in a compressed state. The piston 43 is biased toward a side (the first end portion side in the direction of the center axis C) approaching the valve main body 20 by the biasing member 44.

The fluid supply portion 45 supplies or discharges a fluid L such as oil to a space in the cylinder 42 opposite to the side on which the biasing member 44 is disposed with respect to the piston 43.

The spindle 46 extends along the center axis C of the valve stem 32. That is, the spindle 46 coaxially extends with the valve stem 32. The spindle 46 is provided such that an end surface of the first end portion in the direction of the center axis C opposes an end surface of the second end portion of the valve stem 32. In one or more embodiments, the first end portion of the spindle 46 in the direction of the center axis C is a lower end 46b. That is, an end surface of the lower end 46b of the spindle 46 opposes an end surface of the upper end 32t of the valve stem 32. A second end portion of the spindle 46 is connected to the piston 43 in the direction of the center axis C. In one or more embodiments, the second end portion of the spindle 46 in the direction of the center axis C is the upper end 32t. The spindle 46 penetrates the cylinder 42 and extends toward the first end portion side in the direction of the center axis C. The lower end 46b of the spindle 46 is integrally connected to the upper end 32t of the valve stem 32 via the connection member 50 described later. The lower end 46b of the spindle 46 has the same shape as that of the upper end 32t of the valve stem 32.

In the valve drive portion 40, during a normal operation of the steam turbine 2, a space 42s in the cylinder 42 is filled with the fluid L from the fluid supply portion 45, and thus, the piston 43 in the cylinder 42 is moved to a predetermined position by a pressure of the fluid L and is held. As a result, the valve disc 30 which is supported by the piston 43 via the spindle 46 and the valve stem 32 is positioned at a position separated from the valve seat portion 21. Accordingly, a flow of the steam in the flow path 20r is opened, and thus, the steam supply pipe 5 is in an open state.

In addition, when abnormality or the like occurs in the steam turbine 2, the valve drive portion 40 discharges the fluid L with which the inside of the cylinder 42 is filled from the fluid supply portion 45 to the outside. As a result, the piston 43 is moved toward the valve main body 20 side in the cylinder 42 by a biasing force of the biasing member 44. According to the movement of the piston 43, the valve disc 30, which is supported by the piston 43 via the spindle 46 and the valve stem 32, moves toward the valve seat portion 21 of the valve main body 20. As a result, the taper portion 31 abuts the valve seat portion 21. Accordingly, the flow of the steam in the flow path 20r is blocked, and thus, the steam supply pipe 5 is in a closed state.

Hereinafter, the connection member 50 which connects the valve stem 32 and the spindle 46 to each other will be described.

Figure 3:
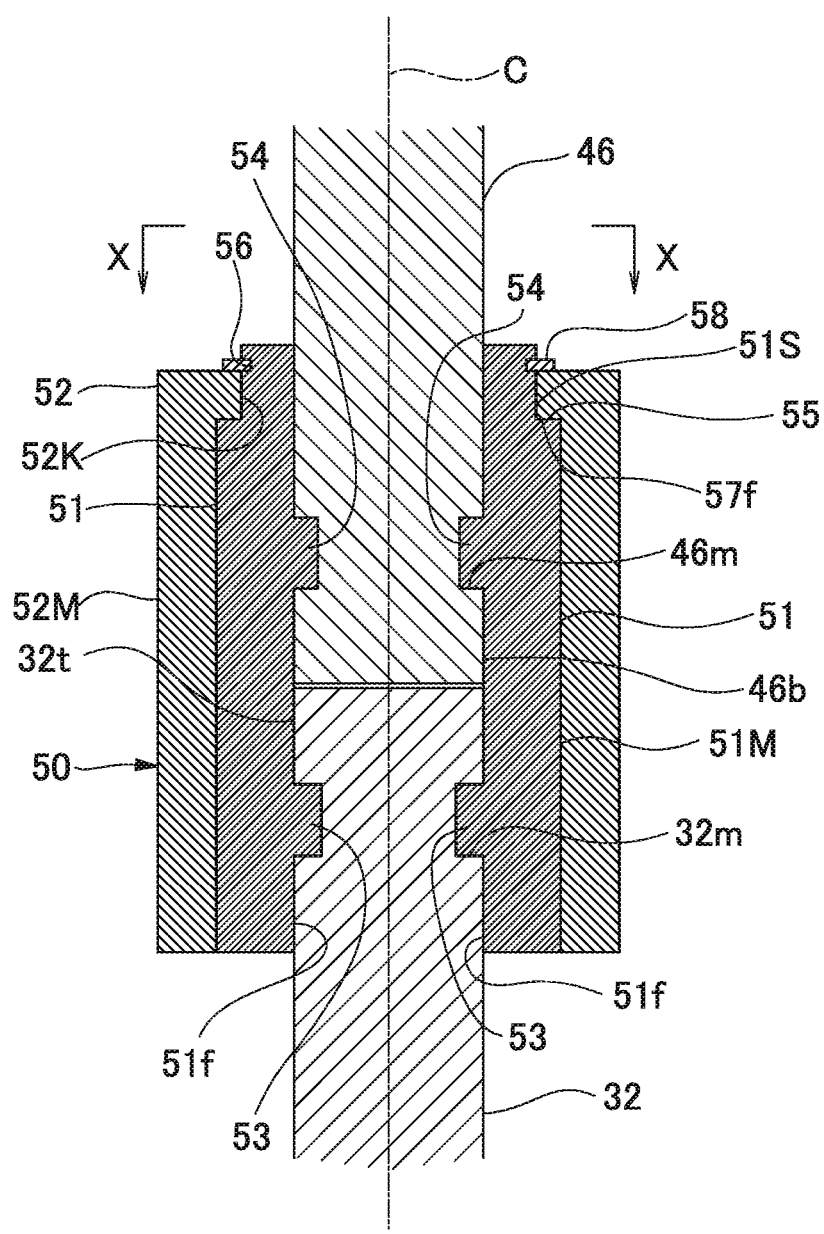
FIG. 3 is a sectional view showing a connection member which connects a valve stem and a spindle of the stop valve to each other according to one or more embodiments.
Figure 4:
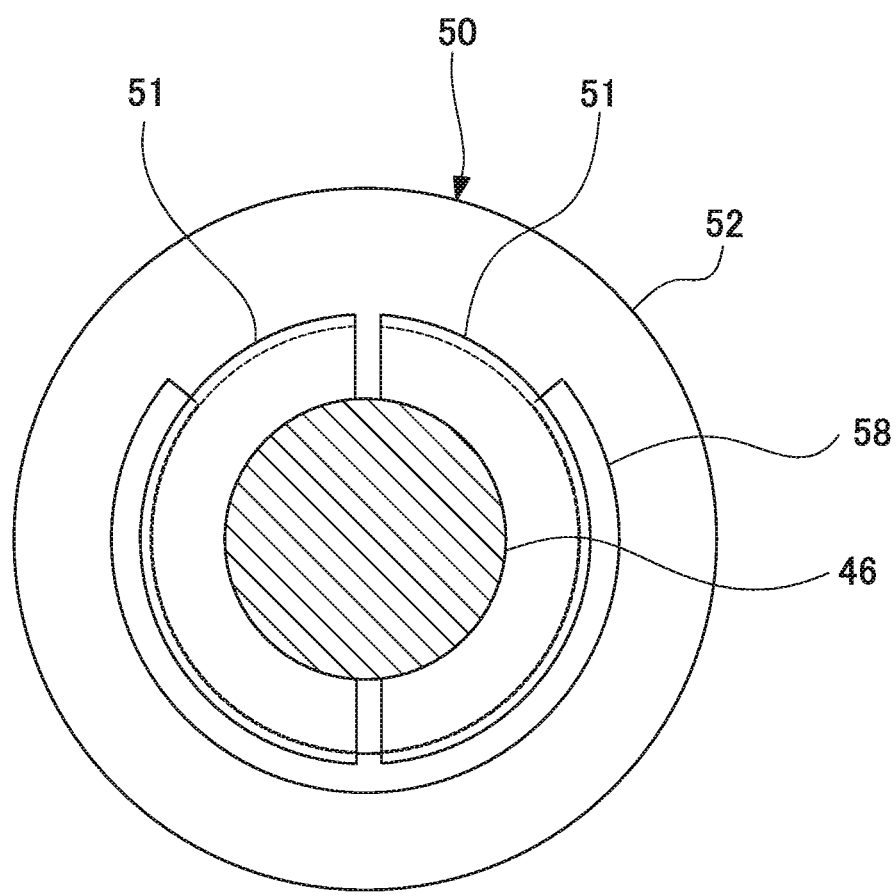
FIG. 4 is a sectional view taken along line X-X of FIG. 3 showing a structure in which the valve stem and the spindle of the stop valve are connected to each other by the connection member according to one or more embodiments.

FIG. 3 is a sectional view showing the connection member which connects the valve stem and the spindle of the stop valve to each other according to one or more embodiments. FIG. 4 is a sectional view taken along line X-X of FIG. 3 showing a structure in which the valve stem and the spindle of the stop valve are connected to each other by the connection member according to one or more embodiments.

As shown in FIG. 3, and in accordance with one or more embodiments, the valve stem 32 includes a valve stem-side annular groove (valve rod-side engaged recessed portion) 32m which is recessed in the radial direction about the center axis C. In one or more embodiments, the valve stem-side annular groove 32m is a groove which is formed on an outer peripheral surface of the upper end 32t of the valve stem 32 to be annularly continued around the center axis C. The valve stem-side annular groove 32m has a rectangular sectional shape extending in the direction of the center axis C.

The spindle 46 includes a spindle-side annular groove (core rod-side engaged recessed portion) 46m which is recessed in the radial direction. In one or more embodiments, the spindle-side annular groove 46m is a groove which is formed on an outer peripheral surface of the lower end 46b of the spindle 46 to be annularly continued around the center axis C. The spindle-side annular groove 46m has a rectangular sectional shape extending in the direction of the center axis C.

As shown in FIGS. 3 and 4, the end surface of the upper end 32t of the valve stem 32 and the end surface of the lower end 46b of the spindle 46 are integrally connected to each other by the connection member 50 in a state where both end surfaces are butted against each other in the direction of the center axis C. The connection member 50 includes a coupler, a cover 52, and a snap ring (restraint member) 58.

The coupler is divided into a plurality of coupling members (or couplings) in the circumferential direction about the center axis C. That is, the connection member 50 includes a plurality of coupling members 51 (e.g., two couplings). In one or more embodiments, the coupling members 51 are members between which the upper end 32t of the valve stem 32 and the lower end 46b of the spindle 46 are interposed from the outside in the radial direction. In one or more embodiments, a pair of the coupling members 51 is combined to each other to be formed in the tubular shape. Each of the coupling members 51 includes a main body portion 51M, a valve stem-side protruding portion (valve rod-side engagement protruding portion) 53, a spindle-side protruding portion (core rod-side engagement protruding portion) 54, and a small diameter portion (protrusion portion) 51S.

The main body portion 51M has a semicircular sectional shape orthogonal to the center axis C of the valve stem 32 and the spindle 46. The main body portion 51M is formed with an inner diameter dimension in which an inner peripheral surface 51f of the main body portion 51M is slightly larger than an outer diameter of each of the upper end 32t of the valve stem 32 and the lower end 46b of the spindle 46.

The valve stem-side protruding portion 53 engages with the valve stem-side annular groove 32m. The valve stem-side protruding portion 53 is integrally formed with the main body portion 51M. The valve stem-side protruding portion 53 is provided the inner peripheral surface 51f of the main body portion 51M. The valve stem-side protruding portion 53 protrudes to the inside in the radial direction from the inner peripheral surface 51f toward the valve stem 32 side and is continuously formed in the circumferential direction. The valve stem-side protruding portion 53 has a rectangular sectional shape which extends in the direction of the center axis C.

The spindle-side protruding portion 54 engages with the spindle-side annular groove 46m. The spindle-side protruding portion 54 is integrally formed with the main body portion 51M. The spindle-side protruding portion 54 is provided on the inner peripheral surface 51f of the main body portion 51M. The spindle-side protruding portion 54 protrudes to the inside in the radial direction from the inner peripheral surface 51f toward the spindle 46 side and is continuously formed in the circumferential direction. The spindle-side protruding portion 54 has a rectangular sectional shape which extends in the direction of the center axis C.

The small diameter portion 51S protrudes from the main body portion 51M in the direction of the center axis C. The small diameter portion 51S protrudes in the direction of the center axis C from the cover 52 in a state where the cover 52 described later is mounted. In one or more embodiments, the small diameter portion 51S protrudes from the main body portion 51M toward the spindle 46 side. The small diameter portion 51S is formed to have an outer diameter dimension which is smaller than that of the main body portion 51M. The small diameter portion 51S has a ring groove (protruding groove portion) 56 which is annularly formed around the center axis C and is recessed in the radial direction. That is, the ring groove 56 is continuously formed on an outer peripheral surface of the small diameter portion 51S in the circumferential direction.

In each coupling member 51, an orthogonal surface 55 which is orthogonal to the direction of the center axis C is formed between the main body portion 51M and the small diameter portion 51S. The orthogonal surface 55 is a flat surface facing the second end portion side which is the side on which the spindle 46 is disposed in the direction of the center axis C.

The coupling members 51 are disposed such that the upper end 32t of the valve stem 32 and the lower end 46b of the spindle 46 are interposed between the coupling members 51 from the outside in the radial direction in a state where the end surface of the upper end 32t of the valve stem 32 and the end surface of the lower end 46b of the spindle 46 oppose each other in the direction of the center axis X. In this case, in each coupling member 51, the valve stem-side protruding portion 53 engages with the valve stem-side annular groove 32m, and the spindle-side protruding portion 54 engages with the spindle-side annular groove 46m. The movements in the direction of the center axis C of the valve stem 32 and the spindle 46 are restrained by the coupling members 51.

The plurality of coupling members 51 are accommodated inside the cover 52 having a tubular shape. The cover 52 restricts the movements of the coupling members 51 toward the outside in the radial direction. The cover 52 has a cylindrical shape as a whole. The cover 52 integrally has a cover main body portion 52M and a contact portion 52K.

The cover main body portion 52M is provided to cover the outer peripheral surfaces of the main body portions 51M of the coupling members 51 in a state where the pair of coupling members 51 oppose each other in the radial direction. An inner peripheral surface of the cover main body portion 52M is formed to come into slide contact with the outer peripheral surfaces of the main body portions 51M. The cover main body portion 52M is formed such that an inner diameter thereof is slightly larger than an outer diameter of the main body portion 51M of the assembled coupling members 51.

The contact portion 52K is provided on an end portion of one side of the cover main body portion 52M in the direction of the center axis C. The contact portion 52K abuts the main body portions 51M in the direction of the center axis C. In one or more embodiments, the contact portion 52K is integrally formed with the cover main body portion 52M at the second end portion side in the direction of the center axis C. The contact portion 52K abuts the main body portions 51M from the second end portion side in the direction of the center axis C. The contact portion 52K protrudes from the inner peripheral surface of the cover main body portion 52M toward the inside in the radial direction. The contact portion 52K is formed to be annularly continued around the center axis C. An abutting surface 57f directed in the direction of the center axis C is formed on a side of the contact portion 52K connected to the cover main body portion 52M. The abutting surface 57f is a flat surface facing the first end portion side in the direction of the center axis C.

The snap ring (restraint member) 58 restricts the movement of the cover 52 in the direction of the center axis C in a state where the contact portion 52K abuts the main body portions 51M. In one or more embodiments, the snap ring 58 restricts the movement of the cover 52 with respect to the coupling members 51 toward the second end portion side in the direction of the center axis C. The snap ring 58 engages with the ring grooves 56 from the outside in the radial direction. As shown in FIG. 4, and in accordance with one or more embodiments, the snap ring 58 has an inner diameter which is smaller than that of the outer peripheral surface of the small diameter portion 51S. For example, the snap ring 58 is formed in a C shape.

As shown in FIG. 3, and in accordance with one or more embodiments, the cover 52 is mounted such that the outer peripheral surfaces of the coupling members 51 and the inner peripheral surface of the cover main body portion 52M come into slide contact with each other in a state where the pair of coupling members 51 opposes each other. The movements of the pair of coupling members 51 toward the outside in the radial direction are restrained by the cover main body portion 52M.

The cover 52 is provided in a state where the contact portion 52K is positioned on the second end portion sides in the direction of the center axis C with respect to the small diameter portions 51S of the pair of coupling members 51 and the abutting surface 57f of the contact portion 52K comes into contact with the orthogonal surfaces 55 on the coupling member 51 side. Accordingly, the movement of the cover 52 toward the valve stem 32 side, which is the first end portion side in the direction of the center axis C, is restricted.

In this state, the small diameter portions 51S of the pair of coupling members 51 protrude to the second end portion side in the direction of the center axis C from the contact portion 52K. In addition, the C-shaped snap ring 58 is mounted on the ring grooves 56 formed on the outer peripheral surfaces of the small diameter portions 51S of the coupling members 51. As a result, the contact portion 52K is interposed between the orthogonal surfaces 55 of the coupling members 51 and the snap ring 58. Accordingly, the movement of the cover 52 in the direction of the center axis C is restrained.

Figure 5:
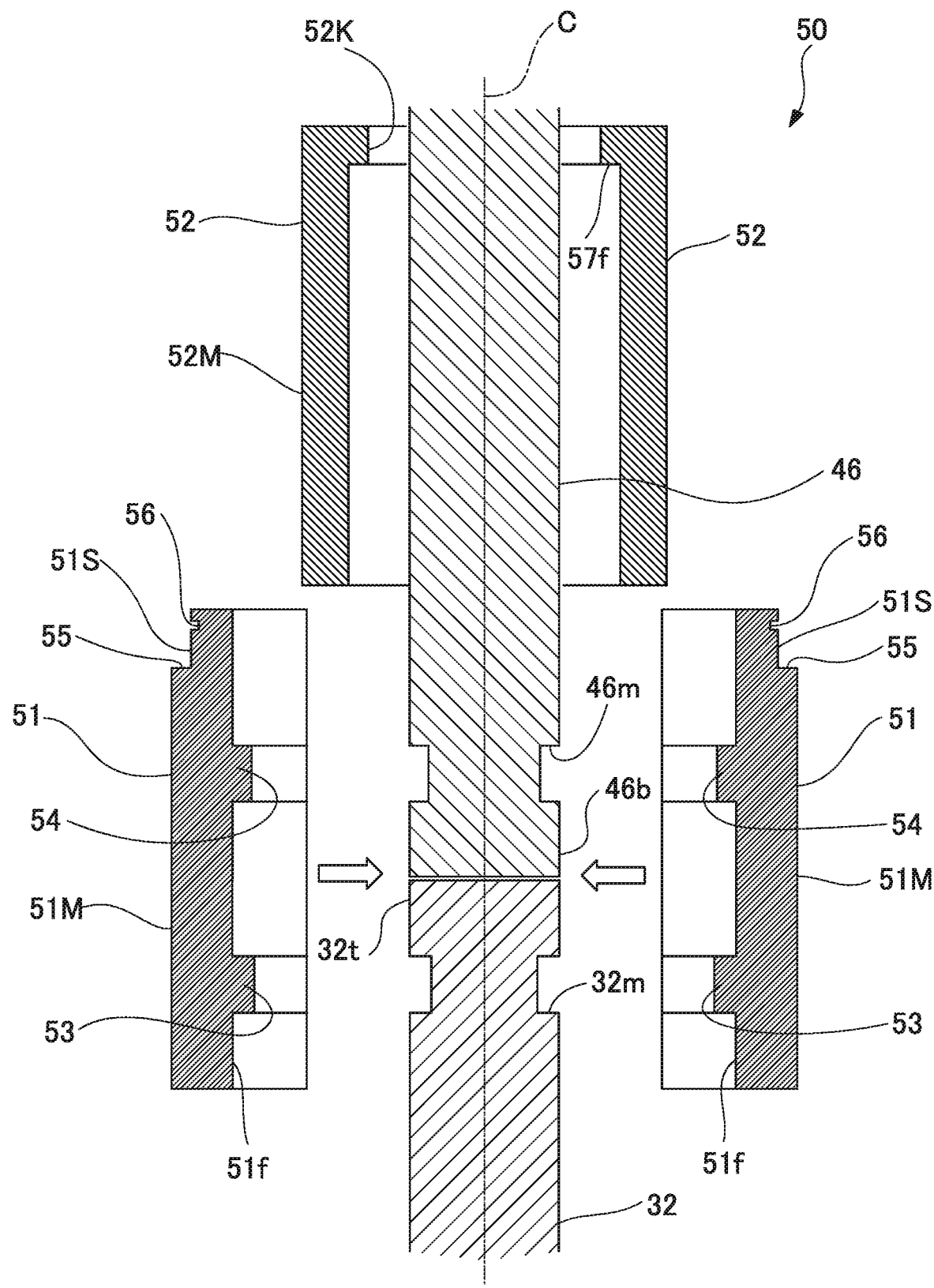
FIG. 5 is a sectional view showing how a coupler is attached during a procedure of connecting the valve stem and the spindle of the stop valve to each other by the connection member according to one or more embodiments.
Figure 6:
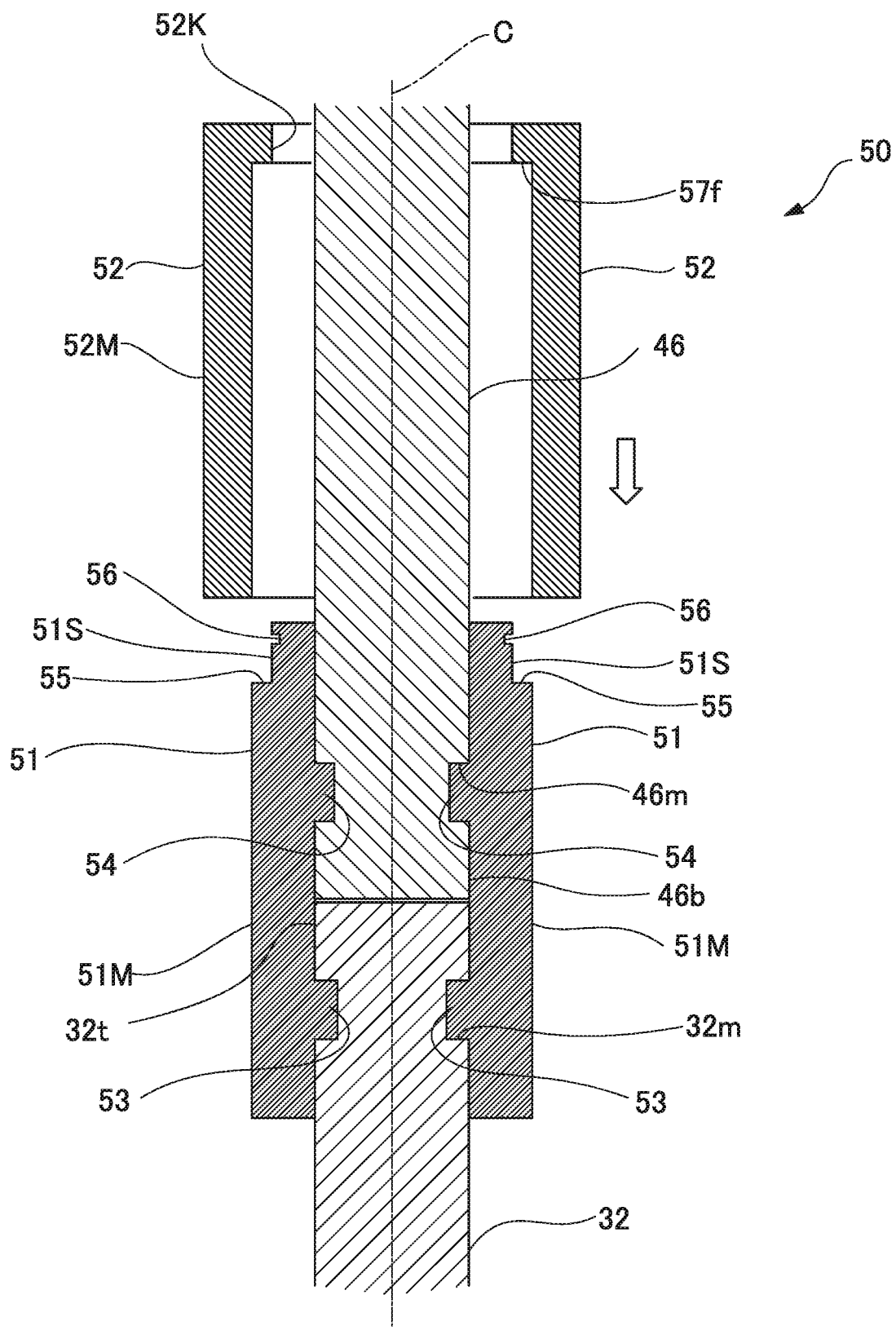
FIG. 6 is a sectional view showing how a cover is attached during a procedure of connecting the valve stem and the spindle of the stop valve to each other by the connection member according to one or more embodiments.

FIG. 5 is a sectional view showing how the coupler is attached during a procedure of connecting the valve stem and the spindle of the stop valve to each other by the connection member according to one or more embodiments. FIG. 6 is a sectional view showing how the cover is attached during a procedure of connecting the valve stem and the spindle of the stop valve to each other by the connection member according to one or more embodiments.

In order to connect the valve stem 32 and the spindle 46 to each other by the connection member 50, as shown in FIG. 5, and in accordance with one or more embodiments, first, the end surface of the upper end 32t of the valve stem 32 and the end surface of the lower end 46b of the spindle 46 oppose each other in the direction of the center axis C. In this state, the cover 52 passes through the spindle 46 and is retracted upward. Thereafter, the end surface of the upper end 32t of the valve stem 32 and the end surface of the lower end 46b of the spindle 46 are brought close to each other, and the valve stem 32 and the spindle 46 are disposed so as to form minute gaps to such an extent that bolts or the like cannot be inserted.

Thereafter, as shown in FIG. 6, and in accordance with one or more embodiments, the pair of coupling members 51 moves from the outside toward the inside in the radial direction such that the upper end 32t of the valve stem 32 and the lower end 46b of the spindle 46 are interposed between the coupling members 51. In this case, in each coupling member 51, the valve stem-side protruding portion 53 engages with the valve stem-side annular groove 32m and the spindle-side protruding portion 54 engages with the spindle-side annular groove 46m.

Thereafter, as shown in FIG. 3, and in accordance with one or more embodiments, the cover 52 of the connection member 50 moves toward the coupler, and thus, the pair of coupling members 51 is received in the cover 52. Accordingly, the pair of coupling members 51 is restrained in a state where the movements of the coupling members 51 toward the outside in the radial direction are restricted. In this case, the contact portion 52K of the cover 52 is positioned outside in the radial direction with respect to the small diameter portions 51S of the pair of coupling members 51, and the abutting surface 57f of the contact portion 52K abuts the orthogonal surfaces 55 on the coupling member 51 side.

In this state, the small diameter portions 51S of the pair of coupling members 51 protrude from the contact portion 52K. Accordingly, the snap ring 58 is mounted on the ring grooves 56 formed on the outer peripheral surfaces of the small diameter portions 51S of the pair of coupling members 51. As a result, the movement of the cover 52 in the direction of the center axis C is restrained. Accordingly, the upper end 32t of the valve stem 32 and the lower end 46b of the spindle 46 are connected to each other by the connection member 50.

According to the above-described stop valve 10 and steam turbine 2, the movements of the pair of coupling members 51 toward the outside in the radial direction can be restricted by the cover main body portion 52M. Accordingly, the engagement state between the valve stem-side protruding portion 53 and the valve stem-side annular groove 32m and the engagement state between the spindle-side protruding portion 54 and the spindle-side annular groove 46m are maintained. Accordingly, during the operation of the steam turbine 2, when the valve stem 32 and the spindle 46 move relative to each other due to pulsation or the like of the steam passing through the stop valve 10, it is possible to prevent the connection between the valve stem 32 and the spindle 46 from being released. Accordingly, it is possible to reliably connect the upper end 32t of the valve stem 32 and the lower end 46b of the spindle 46 to each other. In addition, it is possible to connect the valve stem 32 and the spindle 46 to each other only by disposing the cover 52 after disposing the pair of coupling members 51 outside the upper end 32t of the valve stem 32 and the lower end 46b of the spindle 46 in the radial direction. That is, it is possible to easily connect the valve stem 32 and the spindle 46 to each other without performing a laborious work such as tightening or loosening a bolt. Moreover, the valve stem 32 and the spindle 46 are easily and reliably connected to each other, and thus, it is possible to increase efficiency of assembling work or maintenance work.

It is unnecessary to use a member such as a bolt to firmly connect the pair of coupling members 51 to each other. Therefore, there is no need to provide a space for inserting a member such as a bolt between the upper end 32t of the valve stem 32 and the lower end 46b of the spindle 46. Accordingly, it is possible to decrease the size of the connection member 50.

The contact portion 52K abuts the main body portions 51M from the second end portion side in the direction of the center axis C, and thus, the abutting surface 57f and the orthogonal surfaces 55 come into contact with each other. Accordingly, it is possible to prevent the cover 52 from being displaced toward the first end portion side in the direction of the center axis C. Accordingly, it is difficult for the cover 52 to fall off, and it is possible to prevent the cover 52 from being carelessly disengaged from the coupling members 51.

The snap ring 58 engages with the ring grooves 56 in a state where the abutting surface 57f comes into contact with the orthogonal surfaces 55, and thus, the contact portion 52K can be interposed between the main body portions 51M and the snap ring 58. That is, the abutting surface 57f abuts the coupling members 51, and thus, the movement of the cover 52 toward the first end portion side in the direction of the center axis C is restricted, and the movement of the cover 52 toward the second end portion side in the direction of the center axis C is restricted by the snap ring 58. Accordingly, it is possible to prevent the cover 52 from being displaced in the direction of the center axis C from the state where the contact portion 52K abuts the main body portions 51M. That is, the movement of the cover 52 in the direction of the center axis C is restricted not only by the contact portion 52K but also by the snap ring 58. Accordingly, it is difficult for the cover 52 to fall off further.

The ring grooves 56 engaging with the snap ring 58 are formed on the small diameter portions 51S protruding in the direction of the center axis C from the cover 52. Accordingly, even after the cover 52 is attached to the coupling members 51, it is possible to view the ring grooves 56. As a result, the snap ring 58 which is the restraint member can be attached at a position which the snap ring 58 can be viewed from the outside. Therefore, it is possible to easily attach the snap ring 58, and it is possible to easily mount the connection member 50.

In addition, the connection member and the stop valve of the present invention are not limited to the embodiments described above with reference to the drawings, and various modification examples are considered within the technical scope.

For example, in one or more embodiments, the connection member 50 includes the pair of coupling members 51. However, the connection member 50 may include a coupler which is divided into three or more coupling members in the circumferential direction.

Moreover, in one or more of the above-described embodiments, the configuration of the steam turbine system 1 is described. However, a specific configuration thereof can be appropriately changed.

In addition, the stop valve 10 shown in one or more of the above-described embodiments can be used in other applications other than the steam turbine system 1.

Moreover, as long as configurations do not deviate from the gist of the present invention, it is possible to select the configurations described in the above embodiments or to appropriately change the configurations to other configurations.

INDUSTRIAL APPLICABILITY

According to the stop valve, it is possible to easily and reliably connect the valve stem 32 and the spindle 46 to each other.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: steam turbine system
2: steam turbine
2A: turbine main body
2s: output shaft
3: boiler
4: generator
5: steam supply pipe
10: stop valve
20: valve main body
20r: flow path
21: valve seat portion
22: valve disc support portion
22g: guide bush
30: valve disc
31: taper portion
32: valve stem
32b: lower end
32m: valve stem-side annular groove (valve rod-side engaged recessed portion)
32t: upper end
40: valve drive portion
41: support member
42: cylinder
43: piston
44: biasing member
45: fluid supply portion
46: spindle
46b: lower end
46m: spindle-side annular groove (core rod-side engaged recessed portion)
46t: upper end
50: connection member
51: coupling member
51M: main body portion
51S: small diameter portion (protrusion portion)
51f: inner peripheral surface
52: cover
52K: contact portion
52M: cover main body portion
53: valve stem-side protruding portion (valve rod-side engagement protruding portion)
54: spindle-side protruding portion (core rod-side engagement protruding portion)
55: orthogonal surface
56: ring groove
57f: abutting surface
58: snap ring (restraint member)
C: center axis

What is claimed is:

1. A stop valve, comprising:
a valve seat in a fluid flow path;
a valve disc that contacts the valve seat and that closes the fluid flow path;
a valve stem that extends along a center axis and comprises a first end, in a direction of the center axis, that is connected to the valve disc;
a spindle that extends along the center axis and comprises an end surface of a first end, in the direction of the center axis, that faces an end surface of a second end of the valve stem, in the direction of the center axis; and
a connector that connects the second end of the valve stem to the first end of the spindle,
wherein the valve stem comprises a valve rod-side engaged recession recessed in a radial direction about the center axis,
wherein the spindle includes a core rod-side engaged recession recessed in the radial direction,
wherein the connector includes:
a coupler divided in a circumferential direction about the center axis into a plurality of couplings, each comprising:
a valve rod-side engagement protrusion that engages with the valve rod-side engaged recession; and
a core rod-side engagement protrusion that engages with the core rod-side engaged recession, on an inner peripheral surface of the coupling; and
a cover, that is tube-shaped, accommodates the plurality of couplings therein, and restricts movements of the plurality of couplings in an outward radial direction,
wherein the cover includes a contact surface that abuts the plurality of couplings in the direction of the center axis,
wherein the connector further includes a restraint that restricts a movement of the cover in the direction of the center axis when the contact surface abuts the plurality of couplings,
wherein each of the plurality of couplings further comprises a third protrusion that protrudes beyond the cover in the direction of the center axis,
wherein the third protrusion comprises a ring groove that is annularly formed around the center axis and is recessed in the radial direction, and
wherein the restraint is a snap ring that engages with the ring groove from the outward radial direction.

2. A steam turbine, comprising:
the stop valve according to claim 1; and
a turbine main body which is driven by steam supplied from the flow path which is opened and closed by the stop valve.

* * * * *